United States Patent [19]

Ledru

[11] 4,004,959

[45] Jan. 25, 1977

[54] UNSATURATED POLYESTER WITH POLYIMIDE-AMMONIA PREPOLYMERS AS THERMOSETTING LAMINATE

[75] Inventor: Pierre Ledru, Lyon, France

[73] Assignee: Rhone-Poulenc Industries, Paris, France

[22] Filed: Feb. 13, 1975

[21] Appl. No.: 549,788

[30] Foreign Application Priority Data

Feb. 15, 1974  France .............................. 74.05209

[52] U.S. Cl. ............................. 156/331; 156/332; 260/29.6 HN; 260/30.2; 260/32.6 NA; 260/33.4 R; 260/857 PE; 260/861; 260/862; 428/474

[51] Int. Cl.² ..................... C09J 3/02; C08L 67/06; C08L 77/00

[58] Field of Search ... 260/857 PE, 78 UA, 857 UN, 260/861, 862, 78 TF, 47 UA, 47 CZ; 156/331; 428/474

[56] References Cited

UNITED STATES PATENTS

| | | | |
|---|---|---|---|
| 3,532,661 | 10/1970 | Vayson De Pradenne | ... 260/857 PE |
| 3,729,446 | 4/1973 | Holub et al. | ...................... 260/861 |
| 3,839,493 | 10/1974 | Balme et al. | ................. 260/78 UA |
| 3,840,499 | 10/1974 | Diguilio | ........................ 260/78.5 T |
| 3,883,486 | 5/1975 | Bargain | ......................... 260/78 UA |
| 3,892,716 | 7/1975 | Boldebuck | ................... 260/78 UA |
| 3,954,711 | 5/1976 | Gruffaz et al. | ................ 260/47 UA |

*Primary Examiner*—Murray Tillman
*Assistant Examiner*—Thurman K. Page
*Attorney, Agent, or Firm*—Stevens, Davis, Miller & Mosher

[57] ABSTRACT

Thermosetting compositions are provided which are particularly suitable for use in the form of solutions, in making laminates. The compositions comprise (a) a prepolymer possessing imide groups derived from a polyimide and ammonia and (b) an unsaturated polyester.

8 Claims, No Drawings

UNSATURATED POLYESTER WITH POLYIMIDE-AMMONIA PREPOLYMERS AS THERMOSETTING LAMINATE

This invention relates to thermosetting compositions.

According to the present invention there are provided compositions which comprise:

a. a prepolymer possessing imide groups, with a softening point from 50° to 200°, prepared by reacting ammonia with a polyimide of the formula:

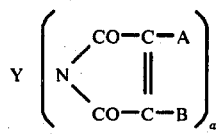
(I)

in which Y represents an organic radical of valency $a$, $a$ is a number ranging from 2 to 4, and each of A and B, which may be identical or different, represents H, $CH_3$ or Cl, the proportions of the reactants being such that there are 2 to 20 imide groups per mol of ammonia; and b. an unsaturated polyester.

In formula (I), Y can represent a divalent radical such as a linear or branched alkylene radical with 2 to 12 carbon atoms, a phenylene radical, a cyclohexylene radical, or one of the radicals of the formulae:

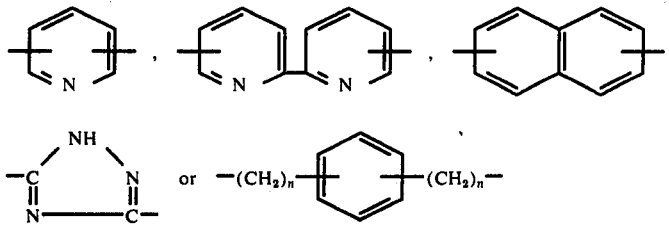

wherein $n$ represents an integer from 1 to 3. The radicals which Y represents can also consist of phenylene or cyclohexylene radicals bonded to one another either directly or by an atom or group which is inert under the conditions of the reaction, such as —O—, —S—, an alkylene group with 1 to 3 carbon atoms, —CO—, —$SO_2$—, —CONH—, —COO—, —P(O)$R^1$—, —CONH—X—NHCO—,

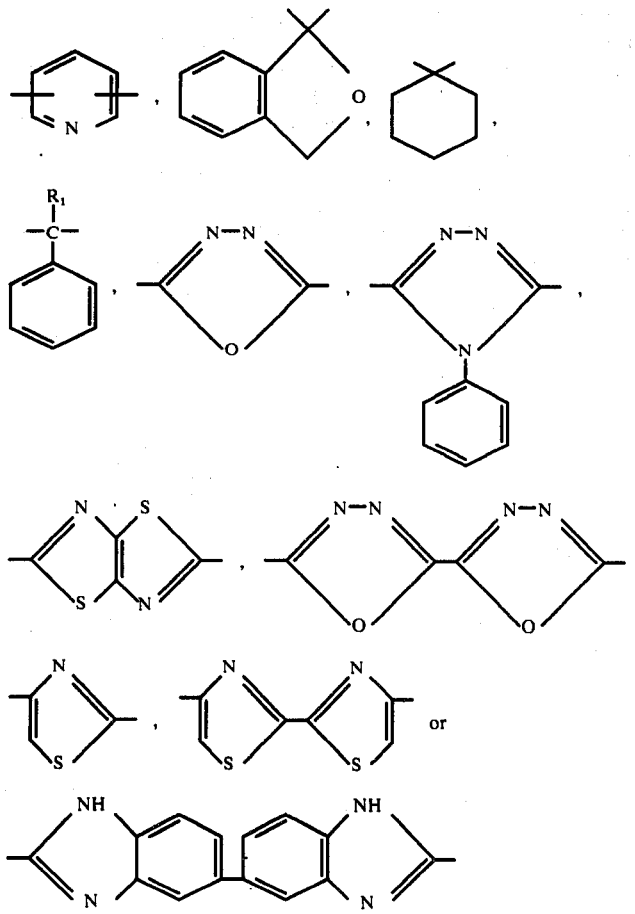

wherein $R^1$ represents a hydrogen atom or an alkyl radical with 1 to 4 carbon atoms, a phenyl radical or a cyclohexyl radical, and X represents an alkylene radical with 2 to 12 carbon atoms. Moreover, the various phenylene or cyclohexylene radicals can be substituted by methyl groups. Y can also represent a radical which can be tri- or tetravalent, the valencies of which are carried by a nucleus which may be of, for example, the benzene-type, optionally substituted by methyl groups, or of the naphthalene-, pyridine- or triazine-type; they can also be carried by several benzene nuclei bonded to one another by a valency bond or by an inert atom or group which can be one of those mentioned above in connection with the divalent radicals, or

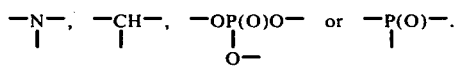

Specific examples of polyimides of formula (I) include bis-imides such as: N,N'-ethylene-bis-maleimide, N,N'-hexamethylene-bis-maleimide, N,N'-meta-phenylene-bis-maleimide, N,N'-para-phenylene-bis-maleimide, N,N'-4,4'-diphenylmethane-bis-maleimide, N,N'-4,4'-(diphenyl ether)-bis-maleimide, N,N'-4,4'-diphenylsulphone-bis-maleimide, N,N'-4,4'-dicyclohexylmethane-bis-maleimide, N,N'-4,4'-(3,5-diphenyl-pyridine)-bis-maleimide, N,N'-pyridine-2,6-diyl-bis-maleimide, N,N'-α,α'-4,4'-dimethylene-cyclohexane-bis-maleimide, N,N'-meta-xylylene-bis-maleimide, N,N'-para-xylylene-bis-maleimide, N,N'-4,4'-diphenyl-cyclohexane-bis-maleimide, N,N'-meta-phenylene-bis-dichloromaleimide, N,N'-4,4'-diphenylmethane-bis-citraconimide, N,N'-4,4'-(1,1-diphenyl-propane)-bis-maleimide, N,N'-4,4'-(1,1,1-triphenyl-ethane)-bis-maleimide, N,N'-dodecamethylene-bis-maleimide, N,N'-4,4'-triphenylmethane-bis-maleimide and N,N'-3,5-(1,2,4-triazole)-bis-maleimide.

These bis-imides can be prepared by applying the methods described in, for example U.S. Pat. No. 3,018,290 and British Pat. Specification No. 1,137,592. Other examples of polyimides of formula (I) include the oligomers possessing imide groups, of the general formula:

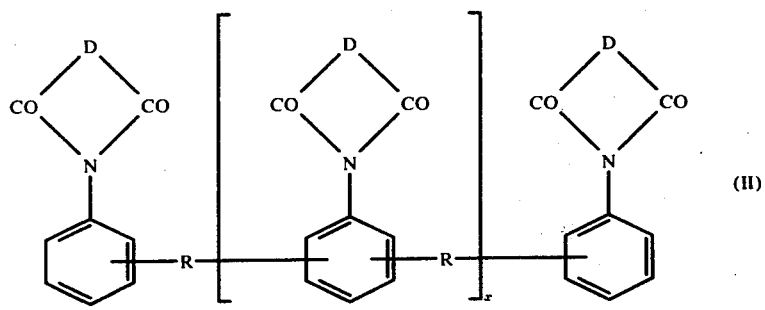

in which X represents a number ranging approximately from 0.1 to 2, R represents a divalent hydrocarbon radical with 1 to 8 carbon atoms, which is derived from an aldehyde or a ketone of the general formula:

$$O = R$$

in which the oxygen atom is bonded to a carbon atom of the radical R, and D represents a divalent organic radical which contains 2 to 24 carbon atoms, the valencies of which are carried by adjacent carbon atoms and which is derived from an internal anhydride of the general formula:

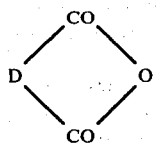

a proportion of at least approximately 60% of the radicals D representing a radical of the formula:

in which A and B are as defined above, it being possible for the radicals D which may remain to represent, in particular, an alkylene, cycloalkylene or aromatic carbo- or hetero-cyclic radical. The preparation of polyimides of formula (II) is described in German Pat. Application No. 2,230,874.

The reaction conditions leading to the prepolymers used in this invention can vary within wide limits. In particular, the ammonia can be employed as an anhydrous gas or in the form of an aqueous or organic solution, especially an alcoholic or aqueous-alcoholic solution. The polyimide can itself be employed in the molten state, in the form of a solution in a polar solvent such as N-methylpyrrolidone, dimethylformamide, dimethylacetamide, N-methylcaprolactam or N-acetyl-pyrrolidone, or in the form of a suspension, for example in water or an organic medium such as an alcohol. According to a preferred procedure, the ammonia is used in the form of an aqueous solution and the polyimide is employed in solution or in suspension. This method of working enables an intimate mixture of the reactants to be obtained easily. It also makes it possible to measure the proportions of the reagents easily.

As indicated above, the proportions of the reactants are such that there are 2 to 20 imide groups per mol of ammonia. The ratio $$\frac{\text{number of imide groups}}{\text{number of mols of NH}_3}$$

is preferably from 2/1 to 10/1.

It is to be understood that when the ammonia is used in the form of a solution, the concentration of the latter is not critical; the upper concentration limit is fixed only by the solubility of ammonia in the solvent at the temperature at which the solution is prepared. As for the lower limit, its value is essentially dictated by practical considerations. Generally, however, there is a need to handle the lowest possible amounts of product which do not take part in the reaction.

The temperature of the reaction of ammonia with the polyimide can vary widely; naturally the temperature has an effect on the period of time for which the reaction mixture is kept at the chosen temperature. Except when the polyimide is employed in the molten state and where, consequently, the reaction mixture must be kept at a temperature at least equal to the melting point of the polyimide, the reaction can, in general terms, take place at a temperature below 200° C, preferably from −30° to +150° C, depending on the nature and the physical state of the reactants employed.

Prepolymers, the softening point of which varies from 60° to 150° C, are preferably used.

The unsaturated polyesters which are used in the compositions according to the invention are well-known products. They are usually prepared by polycondensation of polycarboxylic acid derivatives and polyols; by "polycarboxylic acid derivatives," as used herein, are meant the acids themselves, esters with lower alcohols, acid chlorides and, optionally, anhydrides. Amongst the monomers which undergo polycondensation, at least one contains an olefinic unsaturated bond. In the compositions according to the invention, the unsaturated polyesters are preferably derived from unsaturated polycarboxylic acid derivatives which are diacids or dianhydrides possessing an olefinic double bond in the α,β-position. By way of example, the dicarboxylic acid derivatives can be derived from maleic, chloromaleic, itaconic, citraconic, aconitic, pyrocinchonic, fumaric, chlorendic, endomethylenetetrahydrophthalic, ethylmaleic, succinic, sebacic, phthalic, isophthalic, tetrahydrophthalic, adipic and hexahydrophthalic acids. Ethylene glycol, propylene glycol, diethylene glycol, triethylene glycol, neopentyl glycol, tetraethylene glycol, butylene glycol, dipropylene glycol, glycerol, trimethylolpropane, pentaerythritol, sorbitol and 3,3-bis-(hydroxymethyl)-cyclohexene are amongst the polyols which are most commonly employed.

The term "unsaturated polyester," as used herein, also covers solutions of the abovementioned polycondensates in a liquid monomer which can undergo copolymerisation with them. These monomers are also well-known in the polyester field; examples are styrene, alpha-methylstyrene, vinyltoluene, p-(alpha-methylvinyl)-benzophenone, vinylbenzene, vinyl 2-chloroethyl ether, N-vinylpyrrolidone, 2-vinylpyridine, indene, methyl acrylate, methyl methacrylate acrylamide, N-(tertiary butyl)-acrylamide, acrylonitrile, hexahydro-1,3,5-triacrylo-s-triazine, allyl phthalate, allyl fumarate, allyl cyanurate, allyl phosphate, diethylene glycol diallyl carbonate, allyl lactate, allyl malonate, allyl tricarballylate, allyl trimesate and allyl trimellitate. When a copolymerisable monomer is used, it generally represents from 10 to 60% by weight of the solution of unsaturated polyester.

The unsaturated polyesters can be prepared by applying known methods; on this subject, reference can, for example, be made to KIRK-OTHMER; Encyclopedia of Chemical Technology, 2nd edition, volume 20.

In the compositions according to the invention, amounts of prepolymer possessing imide groups are generally used which represent, by weight, more than 30%, preferably 35 to 95%, of the total weight of the combination (prepolymer + polyester).

The compositions according to the invention are prepared by making an intimate mixture of the prepolymer possessing imide groups and the polyester.

Depending on the physical characteristics of the ingredients, this mixing can involve the usual techniques for mixing finely divided solids, or of making a solution or a suspension of one of the constituents of the mixture in the other which is kept in the liquid state, optionally in a solvent such as one of those which are mentioned above for the preparation of the prepolymer possessing imide groups.

The mixture can then be heated for several minutes, for example 3 to 5 minutes, at a temperature, of the order of 50° to 180° C, which is sufficiently high to produce a homogeneous liquid when the starting mixture contains a solid phase.

In addition to the prepolymer possessing imide groups and the unsaturated polyester, the compositions according to this invention can also comprise, by way of an adjuvant, an aromatic compound (c) which contains 2 to 4 benzene rings, which does not sublime at atmospheric pressure up to 250° C and which has a boiling point above 250° C; the addition of these aromatic compounds makes it possible to extend the period of time during which the composition can be used in the molten state. In these aromatic compounds (c), the benzene rings can form condensed nuclei or can be bonded to one another by a valency bond or by an atom or group which is inert under the reaction conditions, such as

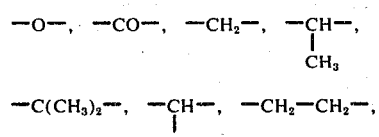

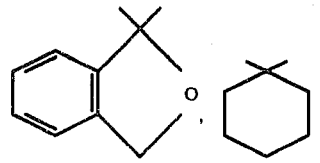

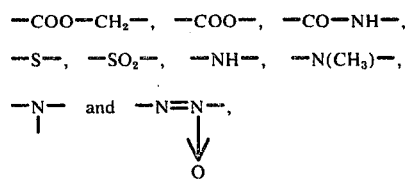

it being understood that in one and the same compound, the joining of the rings can occur in one or more different ways. The benzene rings can be substituted by radicals which are inert under the reaction conditions, such as —OH, —CH₃, —OCH₃, —F, —Cl and —NO₂.

Amongst the compounds (c), there may be mentioned especially the terphenyl isomers, chlorinated diphenyls, phenyl ether, naphthyl-(2,2') ether, o-methoxyphenyl ether, benzophenone, 2,5,4'-trimethylbenzophenone, p-phenylbenzophenone, p-fluorobenzophenone, diphenylamine, diphenylmethylamine, triphenylamine, azobenzene, 4,4'-dimethyl-azobenzene, 2,4-dihydroxy-azobenzene, hydroquinone, azoxybenzene, diphenylmethane, 1,1-diphenyl-ethane, 1,1-diphenylpropane, triphenylmethane, diphenylsulphone, phenyl sulphide, 1,2-diphenyl-ethane, p-diphenoxybenzene, 1,1-diphenylphthalane, 1,1-diphenyl-cyclohexane, phenyl benzoate, benzyl benzoate, p-nitrophenyl terephthalate and benzanilide. The compositions preferably contain up to 10% by weight of aromatic compound (c) which can be introduced at any time during the preparation of the compositions. According to a particular method, the prepolymer is prepared in bulk or in solution and is mixed with the polyester without isolating it beforehand. In this case, the aromatic compound (c) can already be present when the prepolymer is formed. It is advantageous to work in this way when an inhibitor of radical polymerisation, such as hydroquinone or 2,4-dihydroxy-azobenzene, is used as the compound (c).

When in the form of homogeneous liquids, the compositions according to the invention can be used directly, for example for impregnating conductors or moulding by simple, preferably hot, casting. It is also possible, after prior curing of these compositions by heating, to use them in the form of powders, for example to manufacture compression-moulded articles, optionally in combination with fibrous or pulverulent fillers. These fillers, can, more precisely, consist of glass fibres, carbon fibres, asbestos fibres and fibres of synthetic polymers, especially polyamide-imides or aromatic polyamides, or of particles such as particles of graphite, molybdenum disulphide, lead, copper, polytetrafluoroethylene or other fluorinated polymer. As a general rule, the length of the fibres varies from 0.5 to 20 mm and the diameter of the particles is from 0.1 $\mu$ to 5 mm. The compositions can also be used in solution for the preparation of coverings, glueings and laminates, the substrate of which can be based on mineral, vegetable or synthetic fibres. Thus for example a fibrous substrate can be impregnated with the composition, a said substrate is positioned over another said substrate, and the resulting laminate is pressed at a temperature sufficient to cause the composition to cure.

The compositions according to the invention can be cured by heating at temperatures of the order of 100° to 280° C.

The following Examples further illustrate this invention.

EXAMPLE 1

A suspension is prepared at 25° C, starting from:
200 g of N,N'-4,4'-diphenylmethane-bis-maleimide,
1 g of dihydroxy-azobenzene and
176 g of dimethylformamide (DMF).

21.4 g of an aqueous solution of ammonia containing 18.65 % by weight of $NH_3$ is introduced, over the course of 6 minutes, into this suspension. The temperature is 41° C at the end of the running-in process. The suspension is left to stand for 10 minutes and then the whole is heated. At 73° C, a clear solution is obtained and is cooled to 45° C.

85.6 g of a solution of an unsaturated polyester in allyl phthalate are then incorporated into the above solution, which contains a prepolymer which softens at 125° C.

This solution is then cooled to 25° C.

The solution of the polyester used in this experiment was prepared by heating 40.1 kg of maleic acid and 28.2 kg of propylene glycol at 190° C, under nitrogen, for 10 hours, and then dissolving the reaction product in 44 kg of allyl phthalate containing 6 g of hydroquinone.

The final solution, the concentration of which is adjusted to 60%, is used to impregnate glass fabric (silionne-treated satin weave which has been desized by heating and has been treated with an aminosilane) weighing 300 g/m². Approximately 273 g of solution are deposited per m² of fabric.

The preimpregnated product thus obtained is dried in a ventilated oven at 140° C for 12 minutes. 12 squares of dimensions 15 × 15 cm are cut out of the preimpregnated product and these are placed on top of each other; the whole is placed under a press (pressure 60 bars) for 30 minutes at 180° C.

The laminate is stoved for 24 hours at 200° C.

Its mechanical properties are as follows: (FS = flexural strength in kg/mm²; FM = flexural modulus in kg/mm²).

|  | Initial | | After ageing at 250° C | | | | | |
|---|---|---|---|---|---|---|---|---|
|  |  |  | 600 hours | | 1,000 hours | | 2,000 hours | |
|  | FS | FM | FS | FM | FS | FM | FS | FM |
| measurement at 25° C | 52.5 | 2,500 |  |  |  |  |  |  |
| measurement at 200° C | 40.2 | 2,210 |  |  |  |  |  |  |
| measurement at 250° C | 39.6 | 2,150 | 33.7 | 1,950 | 27.3 | 2,010 | 27.5 | 2,080 |

EXAMPLE 2

The experiment of Example 1 is repeated, but using 50 g (instead of 85.6 g) of the solution of the unsaturated polyester. The concentration of the solution used to impregnate the glass fabric is still 60%.

The mechanical properties of the laminate (manufactured as in Example 1) are as follows:

|  | Initial | | After ageing at 250° C | | | | | |
|---|---|---|---|---|---|---|---|---|
|  |  |  | 500 hours | | 1,000 hours | | 2,000 hours | |
|  | FS | FM | FS | FM | FS | FM | FS | FM |
| measurement at 25° C | 52.2 | 2,350 |  |  |  |  |  |  |
| measurement at 200° C | 40.3 | 2,200 |  |  |  |  |  |  |

| | Initial | | After ageing at 250° C | | | | | |
|---|---|---|---|---|---|---|---|---|
| | | | 500 hours | | 1,000 hours | | 2,000 hours | |
| | FS | FM | FS | FM | FS | FM | FS | FM |
| measurement at 250° C | 24.3 | 1,800 | 26.7 | 1,690 | 20.3 | 1,550 | 26.5 | 2,000 |

I claim:

1. A thermosetting composition which comprises:
a. a prepolymer possessing imide groups, with a softening point from 50° to 200° C., prepared by reacting ammonia with a polyimide of the formula:

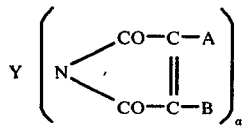

in which $a$ is a number ranging from 2 to 4, Y represents an organic radical of valency $a$ selected from a linear or branched alkylene radical with 2 to 12 carbon atoms, a phenylene radical, a cyclohexylene radical, one of the radicals of the formulae:

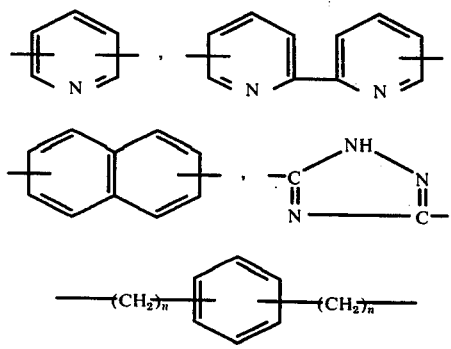

wherein $n$ represents an integer from 1 to 3, a radical consisting of phenylene or cyclohexylene radicals bonded to one another either directly or by an atom or group selected from —O—, —S—, an alkylene group with 1 to 3 carbon atoms, —CO—, —SO$_2$—, —CONH—, —COO—, —P(O)R$^1$—, —CONH—X—NHCO—,

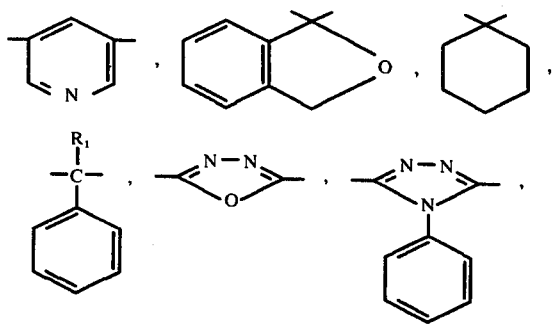

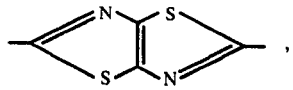

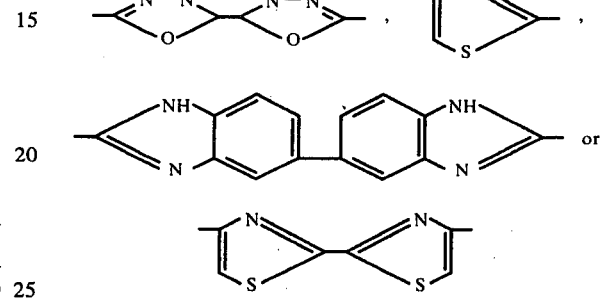

wherein R$^1$ represents a hydrogen atom or an alkyl radical with 1 to 4 carbon atoms, a phenyl radical or a cyclohexyl radical, and X represents an alkylene radical with 2 to 12 carbon atoms, said phenylene and cyclohexylene radicals optionally being substituted by methyl groups or a tri- or tetravalent radical, the valencies of which are carried by a benzene type nucleus, optionally substituted by methyl groups, a naphthalene-type nucleus, a pyridine-type nucleus or a triazine-type nucleus or several benzene nuclei bonded to one another by a valency bond or by an inert atom or group selected from —O—, —S—, an alkylene group with 1 to 3 carbon atoms, —CO—, —SO$_2$—, —CONH—, —COO—, —P(O)R$^1$—, —CONH—X—NHCO,

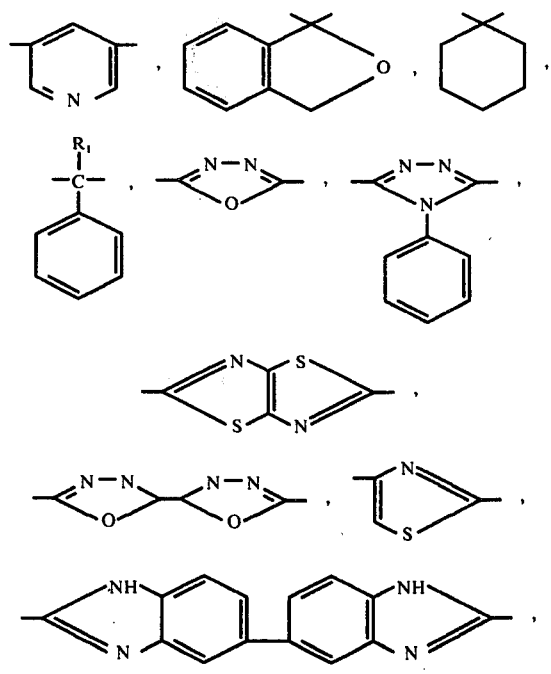

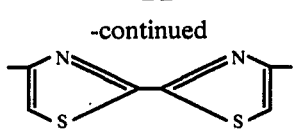

or $-\underset{|}{N}-$, $-\underset{|}{CH}-$, $-OP(O)O-$ or $-P(O)-$
$\phantom{or -N-, -CH-, -OP(O}\underset{O-}{|}$ $\phantom{or -}\underset{|}{}$ and each of A and B, which may be identical or different, represents a hydrogen or chlorine atom or a methyl radical, the proportions of polyimide and ammonia being such that there are 2 to 20 imide groups per mol of ammonia; and b. an unsaturated polyester, the prepolymer being present in an amount from 35% to 95% by weight of the total weight of the prepolymer and unsaturated polyester.

2. A composition according to claim 1, which also comprises an aromatic compound which contains 2 to 4 benzene rings, which does not sublime at atmospheric pressure at a temperature below 250° C and which has a boiling point of at least 250° C.

3. A composition according to claim 2, in which the aromatic compound is a radical polymerisation inhibitor.

4. A composition according to claim 1, in which the unsaturated polyester is used in the form of a solution in a monomer which can copolymerise with it.

5. A composition according to claim 1, in which the ammonia is used in the form of an aqueous, alcoholic or aqueous alcoholic solution.

6. A composition according to claim 1, in which there are 2 to 10 imide groups per mol of ammonia.

7. A composition according to claim 1 in the form of an organic solution.

8. A process for preparing a laminate which comprises applying a composition as defined in claim 1 to a fibrous substrate, positioning one said treated substrate on at least one other said treated substrate and pressing the resulting laminate at a temperature sufficient to cause the composition to cure.

* * * * *